United States Patent

[11] 3,632,428

[72] Inventors  Hyman R. Lubowitz
              Redondo Beach;
              Edgar R. Wilson, Glendale; John F. Jones,
              Torrance; Eugene A. Burns, Palos Verdes
              Peninsula; Troy F. Braswell, Hawthorne,
              all of Calif.
[21] Appl. No. 686,802
[22] Filed      Nov. 30, 1967
[45] Patented   Jan. 4, 1972
[73] Assignee   T R W Inc.
              Redondo Beach, Calif.

[54] THERMALLY STABLE COATINGS
     8 Claims, No Drawings
[52] U.S. Cl. .................................117/161 UN,
                117/132 B, 117/21, 260/78 TF, 260/78.5 R
[51] Int. Cl. ........................................ B44d 1/02
[50] Field of Search.......................... 260/78.5,
                78, 78 TF, 47; 117/161 P, 161 UI, 161 UN, 132 B,
                                                              21

[56]              References Cited
                UNITED STATES PATENTS
2,944,993  7/1960  Brebner et al. ...............  260/78 TF
3,234,181  2/1966  Olivier..........................  260/37
3,423,431  1/1969  Stan et al......................  260/78 TF
3,501,443  3/1970  Di Leone......................  260/78 TF
3,528,950  9/1970  Lubowitz......................  260/78 TF
3,179,634  4/1965  Edwards.......................  260/78
3,422,064  1/1969  Gall..............................  260/47

Primary Examiner—Alfred L. Leavitt
Assistant Examiner—Wm. E. Ball
Attorneys—Daniel T. Anderson, Esq., Gerald Singer and
    Alfons Valukonis ABSTRACT: This invention relates to a high-temperature coating composition and to the method of preparing same which comprises a polyimide prepolymer obtained by coreacting a polyfunctional amine, a polyfunctional anhydride and a monoanhydride characterized by the formula:

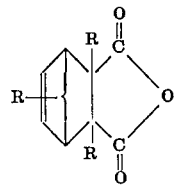

wherein R is selected from the group consisting of hydrogen and a lower alkyl radical. The polyimide prepolymers may be suspended in a liquid vehicle coated onto various substrates and cured by the application of heat in a conventional manner.

THERMALLY STABLE COATINGS

This application is a continuation-in-part of applicants copending application Ser. No. 650,625 filed July 3, 1967, now U.S. Pat. No. 3,528,950.

This invention is directed to the preparation of a high-temperature coating composition and to the method of preparing same which comprises a polyimide prepolymer obtained by coreacting a polyfunctional amine, a polyanhydride and a monoanhydride. More specifically this invention is directed to a method of preparing improved coating compositions which comprises preparing a suspension of a polyimide prepolymer in an organic vehicle, coating the suspension onto a substrate and curing said coating by the application of heat in a conventional manner. The preferred prepolymers used in preparing the novel coating compositions are obtained by reacting a polyfunctional polyamine and a dianhydride with a specific monoanhydride characterized by the formula:

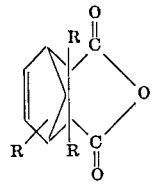

wherein R is selected from the group consisting of hydrogen and the lower alkyl radicals.

These polyimide prepolymers have the following structure:

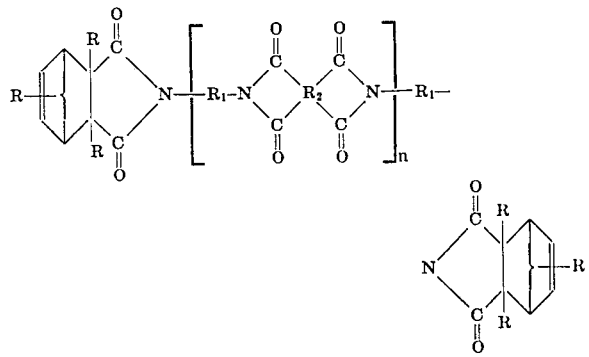

where R represents hydrogen or a lower alkyl group and $R_1$ and $R_2$ represent an aliphatic or aromatic group.

In the past, use of polyimide resins as coatings has found widespread use particularly where high-temperature and chemical stability are required. Frequently however, less desirable polymers have been used as protective coatings due to the fact that the polyimides were too difficult and time consuming to apply. For example, the polyimides were used by forming a solution of the polyamide-acid which was then applied to the surface of an object. Subsequently, heat was applied to the coating to drive off the solvent and to complete the cure reaction of the polyamide-acid to the polyimide. The process time for these coatings generally ranged from 5 to 16 hours with the evolution of a considerable amount of volatile materials. Thus, because of the appreciable amount of volatiles given off during the curing process it was only possible to prepare thin layers of the coating at any one time. If for example, a thick coating of the polyimide were required, it was necessary to buildup several layers in order to obtain a void-free surface. Obviously, however, this approach is expensive from the production standpoint and therefore encouraged a search for materials capable of being applied with the least amount of difficulty and processing time.

Thus, it has been found that the polyimide resin systems of this invention may be used as high-temperature-resistant coatings which have unusual stability and are easy to process. These new polyimides may be characterized by a chain extended polyimide containing an aromatic and/or an aliphatic backbone structure as described more fully herein below.

Accordingly, it is an object of this invention to provide a coating composition which exhibits a high degree of resistance to thermal and oxidative environments.

It is another object of this invention to provide a polyimide coating composition and a process of preparing same which is readily processable and is characterized as having a high degree of stability and easy to process.

It is still another object of this invention to provide a polyimide coating composition obtained from prepolymers exhibiting long storability at moderate temperatures.

It is still a further object of this invention to provide a polyimide coating which can be economically processed into a useful protective surface with excellent mechanical properties and which may be applied with the evolution of a comparatively small amount of volatiles.

These and other objects of the invention will become apparent from a further and more detailed description of the invention as follows.

It has been found that the polyimide system described more specifically herein below may be used as a coating exhibiting high thermal stability and can be prepared by conventional coating techniques. The coatings may be applied to various substrates including metal or nonmetals in neat or pigmented forms. In addition to being thermally stable and resistant to oxidation, the coatings of this invention may be characterized as having excellent flexibility and adhesion to the various substrates.

The prepolymers preferably have molecular-weights ranging from about 500 to 3,000 and may be characterized by a chain extended polyimide containing an aliphatic and/or an aromatic backbone which have reactive terminal groups that are stable at room temperature. Upon curing, the terminal groups become chemically reactive thereupon causing the polyimide prepolymer chains to chemically condense end to end; thereby forming macromolecules having a molecular weight of, for example, around 10,000 or over. This type of chain extension or polymer growth permits the use of the prepolymer in a solvent which may be utilized to coat the various substrates. The coreaction or polymer growth begins simultaneously with the removal of the solvent by the application of heat. Upon further heating, which is common in preparing films applied from a solvent, a finished coating is obtained which has a thermal stability in excess of about 660° F. These coatings are particularly unique in that they have a long shelf-life stability in their prepolymer form and can be readily converted into a finished coating by utilizing processes similar to preparing coatings with less desirable properties. In comparison to the coating compositions of this invention similar coatings were found to be extremely difficult to process in obtaining void-free films of suitable flexibility and adhesion with conventional equipment and over convenient periods of time.

The preferred coatings of this invention comprise polyimide prepolymers which are prepared by condensing at least one aromatic polyamine, an aromatic dianhydride and a specific type of monoanhydride e.g., 3,6-endomethylene-1,2,3,6-tetrahydrophthalic anhydride and 3,6-endomethylene-5-methyl-1,2,3,6-tetrahydrophthalic anhydride. The monoanhydrides may be characterized by the formula:

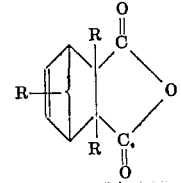

wherein R represents a member selected from the group consisting of hydrogen and a lower alkyl radical such as methyl, ethyl, propyl, butyl, amyl, etc.

The polyimides except for the addition of the specific end-group reactants in accordance with this invention may be prepared by using conventional prior art techniques and thus include the various polyfunctional amines capable of reacting with a polyfunctional anhydride. Suitable polyfunctional amines include the diamines or triamines and in certain instances the tetramines. The following is a representative number of the polyfunctional amines which may be used in preparing the polyimide prepolymers and include for example:

para-phenylene diamine, meta-phenylene diamine, 4,4'-diamino-diphenyl propane, 4,4'-diamino-diphenyl methane, benzidine, 4,4'-diamino-diphenyl sulfide, 4,4'-diamino-diphenyl sulfone, 3,3'-diamino-diphenyl sulfone, 4,4'-diamino-diphenyl ether, 1-5-diamino-naphthalene, 3,3'-dimethoxy benzidine, 2,4-bis (beta-amino-t-butyl)toluene, bis-(paraebeta-amino-t-butyl-phenyl)ether, bis-(para-beta-methyl-delta-amino-pentyl) benzene, bis-para-(1,1-dimethyl-5-amino-pentyl)benzene, 1-isopropyl-2, 4-metaphenylene diamine, m-xylylene diamine, hexamethylene diamine, heptamethylene diamine, octamethylene diamine, nonamethylene diamine, decamethylene diamine, diamino-propyl tetramethylene diamine, 3-methylheptamethylene diamine, 4,4-dimethylheptamethylene diamine, 2,11-diaminododecane, 1,2-bis-(3-amino-propoxy)ethane, 2,2-dimethyl propylene diamine, 3-methoxy-hexamethylene diamine, 3,3'-dimethyl benzidine, 2,-5-dimethylhexamethylene diamine, 2,-5-dimethylheptamethylene diamine, 5-methyl-nonamethylene diamine, 2,17-diamino-eicosadecaner, 1,4-diamino-cyclohexane, 1,10-diamino-1, 10-dimethyl decane, 1,12-diamino-octadecane, and triamines such as:

1,3,5-triaminobenzene, 2,4,6-triamino-s-triazine, 1,2,3-triaminopropane, 4,4'4''-triaminotriphenyl methane, and 4,4'4''AY-triaminotriphenylcarbinol.

The polyfunctional anhydrides which may be employed in the preparation of the polyimide prepolymers of the invention are generally dianhydrides although the tri and tetra anhydrides may be utilized. A representative number of the polyfunctional anhyrides include the following:

Pyromellitic dianhydride
Benzophenone tetracarboxylic dianhydride
2,3,6,7-naphthalene tetracarboxylic dianhydride
3,3',3,4'-diphenyl tetracarboxylic dianhydride
1,2,5,6-naphthalene tetracarboxylic dianhydride
2,2',3,3'-diphenyl tetracarboxylic dianhydride
2,2-bis(3,4-dicarboxyphenyl)propane dianhydride
3,4,9,10-perylene tetracarboxylic dianhydride
bis(3,4-dicarboxyphenyl)ether dianhydride
ethylene tetracarboxylic dianhydride
naphthalene-1,2,4,5-tetracarboxylic dianhydride
nephtalene-1,4,5,8-tetracarboxylic dianhydride
decahydronaphthalene-1,4,5,8-tetracarboxylic dianhydride
4,8-dimethyl-1,2,3,5,6,7,-hexahydronaphtalene-1,2,5,6-tetracarboxylic dianhydride
2,6-dichloronaphthalene-1,4,5,8-tetracarboxylic dianhydride
2,7-dichloronaphthalene-1,4,5,8-tetracarboxylic dianhydride
2,3,6,7-tetrachloronaphthalene-1,4,5,8,-tetracarboxylic dianhydride
phenanthrene-1,8,9,10-tetracarboxylic dianhydride
cyclopentane-1,2,3,4-tetracarboxylic dianhydride
pyrrolidine-2,3,4,5-tetracarboxylic dianhydride
pyrazine-2,3,5,6-tetracarboxylic dianhydride
2,2-bis(2,3-dicarboxyphenyl)propane dianhydride
1,1-bis(2,3-dicarboxyphenyl)ethane dianhydride
1,1-bis(3,4-dicarboxyphenyl)ethane dianhydride
bis(2,3-dicarboxyphenyl)methane dianhydride
bis(3,4-dicarboxyphenyl)methane dianhydride
bis(3,4-dicarboxyphenyl)sulfone dianhydride
benzene-1,2,3,4-tetracarboxylic dianhydride
1,2,3,4-butane tetracarboxylic dianhydride
thiophene-2,3,4,5-tetracarboxylic dianhydride The following examples are an illustration of the many embodiments which may be employed in preparing the coatings of this invention.

EXAMPLE I

Approximately 40.7 g. of 4,4'-methylenedianiline, 32.8 g. of 3,6-endomethylene-1,2,3,6-tetrahydrophthalic anhydride, and 33.9 g. of 3,3',4,4'-benzophenone tetracarboxylic acid dianhydride were dissolved in 170 ml. dimethylformamide and 400 ml. toluene. The solution was refluxed for 18 hours during which time water was collected by means of the Dean Stark receiver. During this reflux period, a cloudy solid phase formed in the solution. At the end of the refluxing period, the solution was cooled to room temperature and filtered. A precipitate or insoluble fraction was collected and dried overnight at 110° C. under vacuum. The filtrate was slowly poured into 3 liters of rapidly stirring water, and stirring was continued overnight. During the stirring, a second precipitate formed and was collected by filtration and dried overnight at 110° C. under vacuum. The first and second dried precipitates were separately ground into a fine powder with a mortar and pestle. Yields for the first and second precipitates were 32.9 g. and 60.9 g., respectively. The light yellow second fraction was determined to melt between 158° to 180° C. One g. of the second fraction and 1 g. of the first fraction were mechanically mixed and placed in a 50 ml. beaker. The beaker containing the powder was placed in an oven at 350° C. for 30 minutes and then cooled to room temperature. The resulting polymer was a brown foam. Thermogravimetric analysis showed the polymer to be stable to 400° C. under nitrogen and has a char residue of 58.9 percent at 800° C. The char residue was glossy black and maintained the original shape of the sample with slightly less mechanical strength.

EXAMPLE II

A solution was prepared by mixing 1000ml. dimethylformamide and 100 ml. toluene to which 122.7 g. 4,4'-oxydianiline was added. The solution was stirred until all the diamine was in solution, and 98.4 g. of 3,6-endomethylene-1,2,3,6-tetrahydrophthalic anhydride was added slowly and stirred until dissolved. Approximately 100.8 g. of 3,3',4,4'-benzophenone tetracarboxylic acid dianhydride was added to the solution, and the solution was refluxed for 18 hours, during which time water was collected by means of a Dean Stark receiver. At the end of the refluxing period, the solution was cooled to room temperature and filtered. A precipitate was collected and dried overnight at 110° C. under vacuum. The filtrate was slowly poured into 10 liters of rapidly stirring water and stirred overnight. A second precipitate was collected by filtration and dried overnight at 110° C. under vacuum. The first and second precipitates were separately ground into a fine powder with a mortar and pestle. Yields for the first and second precipitates were 208.0 g. (m.p. 270°–280° C.) and 97.7 g. (m.p. 165°–190° C.), respectively. One gram of the first precipitate was mechanically mixed with 1 gram of the second precipitate and heated for 30 minutes at 350° C. The resulting polymer was a dark brown, rigid foam.

EXAMPLE III

Approximately 87.0 g. of 4,4'-oxydianiline were dissolved in a solvent mixture of 700 ml. dimethylformamide and 700 ml. toluene. To this solution is added 65.6 g. of 3.6-endomethylene-1,2,3,6-tetrahydrophthalic anhydride and 63.0 g. of 1,4,5,8-naphthalenetetracarboxylic-dianhydride. The solution was refluxed for 18 hours and the water collected in a Dean Stark receiver. The solution was cooled to room temperature and filtered. A precipitate was collected and dried overnight at 110° C. under vacuum. The filtrate was slowly poured into 7 liters of rapidly stirring water and stirring was continued overnight. A second precipitate was collected by filtration and dried overnight at 110° under vacuum. The first and second precipitates were separately ground to a fine powder. Yields for the first and second precipitates were 64.0 g. (m.p. 300° C.) and 134.3 g. (m.p. 205°–250° C.), respectively. One gram of the first precipitate was mixed with 1 gram of the second precipitate and placed in a beaker. The beaker containing the powder was then placed in an oven at 350° C. for 30 minutes and then cooled to room temperature. The resulting black, foamlike polymer tenaciously adhered to the glass.

In preparing the prepolymer two distinct molecular weight ranges are obtained. The lower molecular weight material being soluble in known solvents, e.g., 1-methyl pyrrolidone while the higher molecular weight material is dispersed in the solvent. The mixed molecular weight prepolymer solution-suspension is milled to produce a suspension similar to that used in preparing conventional pigment-loaded paints and coatings. The lower molecular weight materials dissolve in the solvent which acts as the milling media and provides either alone or in combination with other solvents the dilution necessary for processing the coating, e.g., spraying, dipping, etc. However, the end properties of the coating such as hardness, adhesion, flexibility, gloss, etc., will be affected by and can be controlled through the ratio of the low to high molecular weight components. The thickness of the coating for a single pass, e.g., by spraying will depend upon the viscosity and the solid content of the suspension. Although there is a wide latitude for adjusting the ratio of the solids to solvent, solids in an amount of approximately 50 percent and preferably 15–30 percent of the total weight can be added to the solvents without adversely affecting either the viscosity, coating thickness, or process temperatures.

In preparing the coating the polyimide prepolymer may be comminuted to a suitable particle size. One of the factors governing the selection of the particle size of the prepolymer is the viscosity of the coating. Particles which are too coarse for example, will not properly dissolve or be suspended in the solvent. In addition, other problems relating to the method of applying the coating also dictate the maximum size of the particles which may be used. For example, in order to avoid fouling the spray nozzle, spray applications will require a range of particles finer than the range required for flow coating. At the other end of the scale, the criteria for the minimum particle size depends upon the economics of size reduction and the viscosity. Generally, viscosity will exhibit an inverse relationship to the particle size, i.e., viscosity will increase as the particle size decreases. Although the adjustment of particle size is a factor which can be used to adjust the process conditions, it has been found that particles ranging from 10–15 microns are satisfactory in most applications. The various solvents which may be used in preparing the coating compositions are well known and may include organic liquids such as furfural, 1-methyl-2-pyrrolidone, butyrolactone, etc. The solvents dissolve the lower molecular weight fraction of the prepolymer and provide a vehicle for dispersing the high molecular weight fraction to form a paintlike solution-suspension. The high molecular weight and the low molecular weight fractions of the prepolymer may be ground prior to being added to the solvent or large granular particles of the prepolymer may be added to the solvent and subsequently ground using the solvent as a milling media. Moreover, addition of known pigment to the coating compositions may be milled simultaneously with the prepolymer.

Due to the yellow to brown color of the cured polyimide coating, it may be desirable to add pigments to change the color particularly, in those instances where the coating will be exposed. Suitable pigments for purposes of this invention must be stable at temperatures of at least 600° F., and sufficiently chemically stable so as not to react with the solvent or the prepolymer. Generally, the more suitable pigments include the inorganic compounds which are known to be stable at high temperatures, such as $TiO_2$, etc.

The substrates to be coated may include various materials which are capable of withstanding the temperatures at which the prepolymers are cured. Thus, surfaces which are capable of withstanding temperatures of at least 600° F. for periods of at least 30 minutes will provide a suitable coating substrate. Flexible as well as rigid materials may be used where coating thicknesses are not excessive. Ordinary coating thicknesses of about 2 mils are adequately flexible for most substrates including hard ceramics and various flexible metal foils and the like. It is possible in accordance with this invention to provide heavy coating i.e., 0.005 to 0.010 of an inch with subsequent cures which are free of voids. Metal panels coated with the compositions of this invention were heated, for example, in an air-circulating oven at 600° F. for about 30 minutes and were found to have a uniform, pit-free, void-free coating with good surface hardness, good gloss, excellent adhesion (scored tape test), and excellent flexibility, i.e., passed the ⅛mandrel bend without fracture.

Coatings may be cured by utilizing conventional techniques including, for example, a baking oven heated to temperatures ranging from about 390°–660° F. for periods of approximately 30 minutes or more. During the cure period the solvent is driven off and the polyimide prepolymer chains are extended by coreaction between the end capping groups. The amount of volatile matter given off, not including the solvent, is generally less than 2 percent and therefore relatively thick films having good adhesions to the surface may be obtained.

In preparing the coatings on the substrate various known methods may be employed and include, for example, the fluidized bed technique wherein the polyimide prepolymers in a mixture of turbulent inert gas such as nitrogen and employed into which heated objects are suspended so that the surfaces may acquire a coherent coating which is subsequently cured by the application of heat. Alternatively, a mixture of the comminuted solids of the polyimide prepolymer and a liquid vehicle may be employed to apply the prepolymer onto the surface of the object, subsequently the vehicle is evaporated followed by a curing step, whereby the prepolymer is cured to obtain a fused coherent coating. Still further a solution of the polyamide-acid precursor of the polyimide prepolymer may be employed to wet the surface of the object. Subsequently, the solvent is evaporated followed by stepwise heating to advance the polyamide-acid to the polyimide prepolymer and to cure the prepolymer to obtain a fused coherent coating. Other methods which may be employed in applying the coatings of this invention to the substrate are well known and include spray coating, dip coating, flow coating, etc., all of which are followed by conventional curing in a baking oven.

The invention described herein provide a rapid curing polyimide coating which is prepared from a long term shelf-stable prepolymer. These prepolymers which are capable of being converted to polyimide coatings are especially applicable to substrates which are to be exposed to extremely high or low temperature environment, for example, as the advanced high performance aircraft, high-temperature oxidation protection and thermal control coatings for spacecraft and the like.

While this invention has been described with respect to a number of specific embodiments, it is obvious that there are other variations and modifications which can be resorted to without departing from the spirit and scope of the invention as particularly pointed out in the appended claims.

What is claimed is:

1. A process for preparing a high-temperature coating on a substrate which comprises preparing a milled polyimide prepolymer as a solution-suspension in an organic solvent, coating the prepolymer onto the substrate from the organic solvent and curing said coating with heat; said polyimide prepolymer obtained by coreacting a polyfunctional polyamine, polyfunctional anhydride and a monoanhydride characterized by the formula:

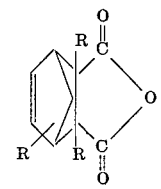

wherein R is a member selected from the group consisting of hydrogen and $C_1$-$C_5$ alkyl radicals.

2. The process of claim 1 further characterized in that the polyfunctional polyamine is an aromatic diamine and the polyfunctional anhydride is an aromatic dianhydride.

3. The process of claim 1 further characterized in that the polyimide prepolymer is prepared by coreacting a polyfunctional aromatic polyamine, an aromatic dianhydride and a monoanhydride selected from the group consisting of 3,6-endomethylene-1,2,3,6-tetrahydrophthalic anhydride and 3,6-endomethylene-5-methyl-1,2,3,6-tetrahydrophthalic anhydride.

4. The process of claim 1 further characterized in that the polyimide prepolymer is coated onto the substrate and cured at temperatures ranging from about 390° to 660° F.

5. The process of claim 1 further characterized in that the anhydride is 3,3',4,4'-benzophenone tetracarboxylic acid dianhydride and the polyamine is 4,4'-methylenedianiline.

6. The process of claim 1 further characterized in that the polyamine is 4,4'-oxydianiline and the dianhydride is 1,4,5,8-naphthalene tetracarboxylic-dianhydride.

7. The process of claim 1 further characterized in that the polyimide prepolymer is prepared in an organic solvent comprising a mixture of dimethyl formamide and toluene.

8. The process of claim 1 in which said organic solvent is selected from the class consisting of: furfural, 1-methyl-2-pyrrolidone and butyrolactone.

* * * * *